United States Patent [19]
Shalov et al.

[11] Patent Number: 5,627,231
[45] Date of Patent: May 6, 1997

[54] DECORATIVE FLOOR COVERINGS HAVING THE APPEARANCE OF CERAMIC TILE AND COMPOSITIONS AND METHODS FOR MAKING SAME

[75] Inventors: Alan A. Shalov, Freehold, N.J.; Eugene Morselander, Humble, Tex.; Ronald Dixon, Warminster, Pa.

[73] Assignee: Congoleum Corporation, Lawrenceville, N.J.

[21] Appl. No.: 289,335

[22] Filed: Aug. 11, 1994

Related U.S. Application Data

[63] Continuation of Ser. No. 830,727, Feb. 4, 1992, abandoned.

[51] Int. Cl.$^6$ .................................................. C08J 3/05
[52] U.S. Cl. ..................... 524/523; 524/284; 524/293; 524/294; 525/227; 525/239
[58] Field of Search ............................ 524/284, 293, 524/294, 523; 525/227, 239

[56] References Cited

U.S. PATENT DOCUMENTS

| | | | |
|---|---|---|---|
| 3,563,936 | 2/1971 | Merrill et al. | 524/297 |
| 4,126,727 | 11/1978 | Kaminski | 428/172 |
| 4,196,243 | 4/1980 | Sachs et al. | 428/147 |
| 4,210,567 | 7/1980 | Kösters | 260/31.8 R |
| 4,379,000 | 4/1983 | Biggin et al. | 106/311 |
| 4,423,178 | 12/1983 | Renshaw | 524/287 |
| 4,501,783 | 2/1985 | Hiragami et al. | 428/147 |

FOREIGN PATENT DOCUMENTS

| | | | |
|---|---|---|---|
| 3543266 | 6/1986 | Germany . | |
| 63-264654 | 11/1988 | Japan | 524/297 |

*Primary Examiner*—Paul R. Michl
*Assistant Examiner*—John J. Guarriello
*Attorney, Agent, or Firm*—Synnestvedt & Lechner

[57] ABSTRACT

Disclosed are compositions comprising plasticizer, first organic polymeric material fused or fusible in the plasticizer and second polymeric material not fusible in the plasticizer, said second polymeric material having a softening point temperature less than about the fusion temperature of the first polymeric material in the plasticizer. The first polymeric material preferably comprises vinyl resin and the second polymeric material preferably comprises acrylate polymers in particulate form. Also disclosed are methods for producing surface coverings comprising converting the liquid plastisols of the present invention to solid compositions under time and temperature conditions sufficient to enable softening, and preferably substantial softening and swelling, of the second polymeric material prior to fusion of the liquid composition.

21 Claims, 2 Drawing Sheets

DECORATIVE FLOOR COVERINGS HAVING THE APPEARANCE OF CERAMIC TILE AND COMPOSITIONS AND METHODS FOR MAKING SAME

This is a continuation of application 07/830,727 filed Feb. 4, 1992, now abandoned.

The present invention relates to decorative surface coverings. More particularly, this invention provides resilient, wear resistant polymer products having unique appearance with thorough decoration and improved aesthetic properties, and compositions and methods for making such products.

Wear resistant synthetic resins have been used in sheet, film or tile form for many purposes. For example, such materials have found widespread use as surface coverings, and particularly as resilient flooring. Compared to other types of floor covering materials, synthetic resins possess many advantages. For example, resilient floor coverings formed of synthetic resin are generally easier to install and are more comfortable to walk on than, for example, ceramic tile.

Despite its advantages, flexible resinous floor covering has nevertheless failed to provide the aesthetic appeal of some of the more earthy materials, such as ceramic tile. It is well known that the appearance of surface coverings frequently has a major impact on the commercial success of such products. Thus, while resilient, plastic flooring generally performs as well as or better than other types of flooring products in terms of wear and feel, it has frequently been less than satisfactory in terms of its aesthetic appeal.

Many techniques and processes have been suggested for the manufacture of resilient, plastic flooring material having improved aesthetic qualities. For example, it is known to incorporate relatively small particles, chips or flakes in decorative plastic sheet materials in order to provide enhanced appearance to the resulting product, as shown in U.S. Pat. No. 4,126,727—Kaminski.

The use of chips or particles embedded in sheet material has also been suggested for the purpose of providing non-slip plastic floor coverings, as disclosed in U.S. Pat. No. 4,501,783—Hiragami et al. This patent describes a plastic flooring material comprising a poly(vinyl chloride) matrix layer having dispersed therein from about 3% to about 30% of resin particles such as poly(methyl methacrylate) and similar acrylic resins. Hiragami et al. require that the resin particles have a softening point higher than the processing temperature of the composition which forms the matrix layer, as well as higher abrasion-resistance than the matrix layer. The patent discloses processing temperatures which are said to be at least about 20° C. lower than the softening point of the particulate resin. The patent explains that this temperature relationship is required to ensure that the resin particles do not melt during formation of the product. This in turn ensures that the resin particles retain their original form in the final product (col. 3, lines 10–22).

U.S. Pat. No. 4,196,243 also discloses non-skid flooring compositions. These compositions comprise a poly(vinyl chloride) plastisol or urethane wear-layer having dispersed therein from about 20 to about 40 percent by weight of particulate plastic. Many materials are suggested for use as the particulate plastic material, including poly (methyl methacrylate) (col 7, lines 45–49). This patent indicates that the particulate plastic should not be soluble in the matrix layer, so as to avoid destroying the discrete nature of the particle (col 7, lines 50–55).

It is an object of the present invention to provide surface covering compositions having the appearance of ceramic tile while retaining the advantages of resilient, resinous surface covering compositions.

SUMMARY OF THE INVENTION

The above and other objects of the present invention are satisfied by compositions comprising carrier, first organic polymeric material fused or fusible in said carrier and second polymeric material not fusible in said carrier, said second polymeric material having a softening point temperature which is less than about the fusion temperature of said first polymeric material in the plasticizer, and preferably within about the gelation temperature range of said first polymeric material in said carrier. It is preferred that the first polymeric material comprise vinyl resin and that the second polymeric material comprise polymer particles.

According to one aspect of the present invention, the compositions comprise flexible, wear-resistant plastisol solids adaptable for use as surface coverings. Such compositions preferably comprise a fused plastisol comprised of plasticizer as the carrier, first organic polymeric material fused in said plasticizer, and second polymeric material comprising organic polymer particles substantially uniformly distributed in said fused plastisol. It has been found that such compositions may have visual characteristics which closely resemble those of ceramic tile.

According to another aspect of the present invention, the compositions comprise fluid plastisol coating compositions capable of conversion to fused plastisol. In such compositions, the plastisol is a fluid plastisol comprising liquid plasticizer as the carrier, first polymeric material dispersed or dissolved in said liquid plasticizer and second organic polymeric material distributed in said plasticizer. When processed according to the methods described herein, such compositions are capable of producing floor covering material having the appearance of ceramic tile.

The method aspects of the present invention are directed to processes for producing surface coverings and surface covering compositions. The methods comprise converting the liquid compositions of the present invention to the solid compositions hereof under time and temperature conditions sufficient to enable softening, and preferably substantial softening and swelling, of the second polymeric material prior to fusion, and preferably during gelation, of the liquid composition. It is generally preferred that the converting step hereof comprise exposing the fluid plastisol compositions to a temperature which is (1) less than about the fusion temperature of said plastisol and (2) greater than the softening point temperature of the second polymeric material for a period of time sufficient to allow the second polymeric material to swell and soften in the unfused plastisol.

The methods aspects hereof typically occur in connection with embodiments which comprise gelling and fusing of a plastisol coating. Such methods preferably comprise providing a fluid coating composition of the type described above, gelling said coating composition, softening said second polymeric material while said composition is in the gel state and/or prior to said composition becoming fused, and fusing said gelled composition. According to one embodiment of the present methods, the gelling step comprises raising the temperature of the fluid coating composition and said softening step preferably comprises controlling the rate of temperature increase of said gelling step to ensure that the second polymeric material undergoes substantial softening prior to the fusion, and preferably while said composition is in the gel state. In particular, and without intending to be bound by or limited to any particular theory, it is believed that relatively slow gelation of the plastisol permits the second polymeric material to soften and swell during processing. It is believed that softening and swelling of the second polymeric material occurs more readily when the plastisol is in the gel phase than when in the fused state. Accordingly, relatively slow rates of gelation more readily permit swelling to occur. It is believed that this swelling phenomena contributes to the desirable aesthetic qualities of the present invention.

DETAILED DESCRIPTION OF PREFERRED EMBODIMENTS

I. THE COMPOSITIONS

Figure 1:
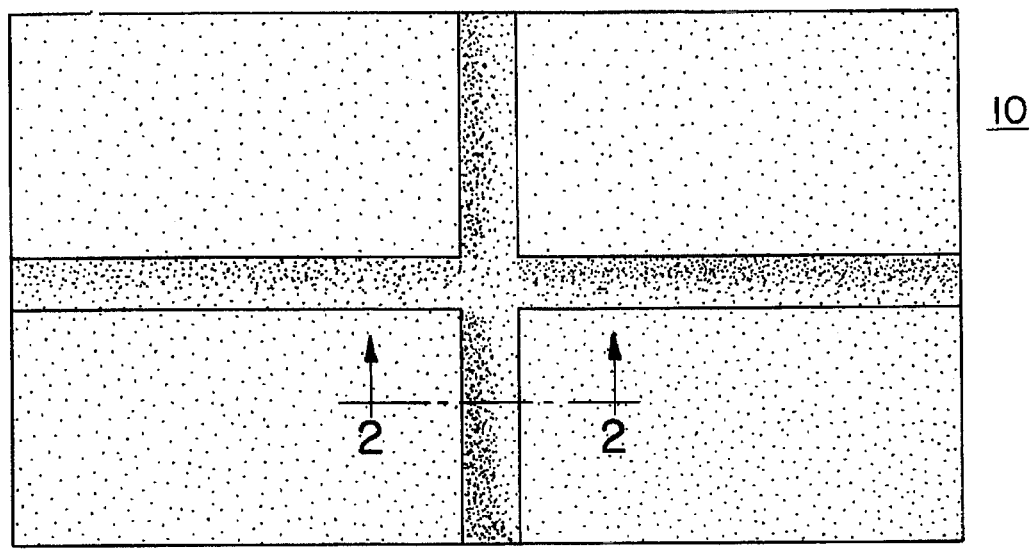

The compositions of the present invention include three essential ingredients: first organic polymeric material; carrier for dispersing, suspending, solvating and/or fusing the first organic polymer material; and second polymeric material. Depending in large part upon the manner in which these ingredients are combined and processed, the present compositions can be in the fluid state or the solid state.

According to one embodiment of this invention, the present compositions are fluid compositions comprising a combination of solids and liquids useful as coatings. According to such embodiments, the first polymeric material is preferably particulate solid dispersed or suspended in a liquid carrier, and preferably a liquid plasticizer. As used herein, the term "carrier" is used in a broad, non-limiting sense and refers generally to materials and agents adapted to disperse, suspend, or solvate the first polymeric material of the present compositions. According to especially preferred embodiments, the carrier comprises plasticizer. Substantially uniform, homogeneous suspensions or dispersions of fine polymeric solids in liquid plasticizer are sometimes referred to herein as fluid plastisols. Such dispersions or suspensions generally take the form of relatively viscous, coatable fluids, such as pastes.

According to another embodiment of the present invention, the present compositions are solid compositions comprising a solid solution of first polymeric material in carrier, preferably plasticizer. Such solid solutions are referred to herein as fused plastisols. As explained fully below, the fluid plastisol compositions of the present invention are readily convertible to the fused plastisol compositions of the present invention.

A. The Second Polymeric Material

An important aspect of the present compositions is the provision of second organic polymeric material having a softening point temperature less than about the fusion temperature of the first polymeric material in the carrier, and even more preferably within about the gelation temperature range of the first organic polymeric material in the carrier.

According to preferred embodiments, the carrier comprises liquid plasticizer and the dispersion or suspension of the first polymeric material therein constitutes a plastisol. As is well known to those skilled in the art, the application of heat to fluid plastisols generally causes physical changes in the rheology of the plastisol. In particular, fluid plastisol compositions are known to pass through or enter a gel phase as the temperature of the plastisol is raised to a sufficiently high level. Without intending to be bound by or limited to any particular theory, it is believed that upon the application of heat to fluid plastisol compositions of the present invention, the plasticizer portion thereof begins solvating the first polymeric material. This initiation of solvation is sometimes referred to as pre-gelation and is associated with the resin particles becoming swollen with plasticizer. As additional heat is applied to the plastisol, continued solvation of the first polymer results in a loss of plastisol fluidity. This loss of fluidity is associated with the "gel phase" or "gel state" of the plastisol. It will be appreciated by those skilled in the art that as the temperature is raised from about room temperature to about the gel point, plastisols will generally first exhibit a decrease in viscosity, followed by a gradual increase in viscosity until the gel point is reached. For the purposes of convenience, the term "gelation temperature range" is used herein to refer to the range of temperatures spanning from about the pre-gelation stage, or about the initial increase in plastisol viscosity, to about the gel point. Techniques are well known and available to those skilled in the art for determining the gel point of any particular plastisol. For example, the gel point may be measured using a gelation plate which is heated only at one end, thereby developing a temperature gradient from one end of the plate to the other. When a plastisol composition is cast onto the plate, the temperature of the plate at the point the plastisol loses its fluidity is frequently referred to as the plastisol's gelation temperature or gel point.

The gelation temperature range of any particular plastisol is a function of many variables, including the type and relative amounts of plasticizer and first polymeric material present. It is generally contemplated, however, that the gelation temperature range of the fluid plastisols of the present invention will take place at temperatures of from about 110° F. to about 340° F., and preferably from about 280° F. to about 340° F. After complete gelation, the plastisol is generally a substantially dry solid with little or no cohesive strength.

Another important aspect of the compositions of the present invention resides in the selection of second polymeric materials that are not fusible in the plasticizer. As is well known to those skilled in the art, the gel comprising the plasticizer and the first organic polymeric material of a plastisol will fuse upon the application of sufficient heat thereto. In particular, it is known that the heating of a plastisol sufficiently past its gel point causes the plasticizer molecules to begin to become incorporated into the matrix of the molecules of the first polymeric materials, and "fusion" begins. As heating continues, the plasticizer becomes substantially integrated into the polymer network of the first polymer. In such a state, the plastisol is said to be a "fused-plastisol." The term "fusion temperature range" is used to refer to that temperature range over which fusion takes place, typically a range of temperatures beginning above about the gel point. In many preferred embodiments, the fusion temperature range is greater than about 280° F.

It has been found that the aesthetic qualities of the present compositions are frequently enhanced when the second polymeric material remain discrete upon fusion of the first polymeric material in the plasticizer. Accordingly, an important aspect of the present invention resides in the selection of a second organic polymeric material which is not fusible in the plastisol. As used herein, the term "non-fusible" refers to a substantial absence of fusion during processing of the present compositions to produce solid, fused plastisol. It will be appreciated by those skilled in the art, however, that some solvation and/or fusion of the second organic polymeric material may occur without departing from the scope of the present invention. That is, it is contemplated that in certain embodiments a minor amount of solvation and/or fusion may be acceptable provided that the discrete nature of the second organic polymeric material remains substantially unaffected.

It has also been found that an important factor in achieving the objects of the present invention is the relationship between the softening temperature of the second polymeric material and the fusion and gelation temperature ranges of the plastisol. In particular, the objects of the present invention are achieved when the softening temperature of the second polymeric material is less than about the fusion temperature of the plastisol. Without intending to be bound by or limited to any particular theory, it is believed that the lack of significant cohesive strength of the plastisol prior to fusion, and particularly during development of the gel phase, permits desirable softening and swelling of the second polymeric material. That is, the second organic polymer, especially when in particle form, swells and changes shape during gelation such that the desired aesthetic characteristics of the present surface covering compositions are achieved.

The particular polymeric material or materials which constitute the second organic polymer of the present invention may be selected from a large number of polymeric materials depending upon several factors, including the particulars of the remaining constituents of the composition. It is contemplated, therefore, that the second polymeric material may comprise organic and/or inorganic polymer. Further, such second polymeric material may comprise homo- and/or copolymers of organic material, including block and graft copolymers, as well as polymer composites and blends, provided that such polymeric materials have the particular softening point and fusion characteristics described above.

The second polymeric materials are preferably organic, thermoplastic polymers. The polymeric materials may be crystalline, amorphous or semi-crystalline. In connection with crystalline, semi-crystalline and amorphous thermoplastic polymers, the term "softening point" will generally coincide with about the glass transition temperature of such polymers.

For compositions in which the first organic polymeric material comprises vinyl resin in major proportion and the carrier comprises plasticizer, and even more preferably plasticizer selected from the group consisting of benzoates, phthalates, butyrates and mixtures of these, it is preferred that the second organic material comprise an acrylic resin, more preferably a methacrylate resin, and even more preferably an ethyl methacrylate resin.

The preferred acrylic resins of the present invention are formed from one or more monomers having the following general structure:

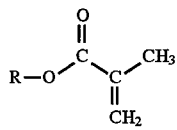

wherein R is H, methyl, ethyl, propyl or butyl. It will thus be appreciated that second polymeric material of the present invention may comprise homo- or co-polymers of one or more methacrylate resins, and preferably methacrylates having the structure identified above. Such resins are generally well known in the art and are available in a wide variety of grades and types. According to certain preferred embodiments, the second polymeric material comprises, and preferably consists essentially of, ethyl methacrylate resin sold under the trade designation Elvacite 2032 or Elvacite 2043. The Elvacite resins described above have a glass transition temperature of from about 145°–150° F.

The second polymeric material preferably comprises particulate material. It is contemplated that the particulate material may comprise any size or shape which permits the particles to be dispersed or suspended in the liquid carrier. Exemplary forms of the particles which are in the form of granules, flakes and chips. The particles may take the shape of many geometric forms, for example, cubes or other polydimensional forms which in cross-section are, for example, rectangular or triangular in shape. Accordingly, the particles can be monodimensional or polydimensional. They can be uniform in shape or randomly shaped. The particles can be transparent, translucent, opaque, or mixtures of these, with transparent and/or translucent being preferred.

The size of the particles of the second polymeric material can vary over a wide range, with the requirement that the particles be capable of being dispersed or suspended in the liquid carrier material dictating the maximum size of the particles. Although particles of other sizes can be used, it is expected that, for most applications, the particles will be less than about 250 microns.

As described above, the second polymeric particles contribute to the decorative and aesthetic properties of the products of the present invention. In addition, or alternatively, it is contemplated that the second polymeric material, and especially the particulate form thereof, may also provide the present products with an improved wearlayer or with an anti-skid surface.

Various factors influence the amount of second polymeric material decorative particles contained in the present compositions, including, for example, the size of the particles, the desired viscosity of the composition, the nature of the and the effect desired in the final product. In applications involving the use of plastisol and second polymeric material in particulate form, the second polymeric material generally will comprise about 1 to about 25 percent by weight of the composition, preferably from about 15 to about 25 percent by weight, and even more preferably about 20 percent by weight.

The viscosity of the liquid composition should be of a value such that the composition is capable of flowing in a manner such that there is an even distribution of the composition to the receiving surface. It is believed that, for most applications, compositions having a viscosity of about 1000 to about 15,000 cps (RVT Spindel No. 4, 20 rpm for one minute, 80° to 84° F.) can be used satisfactorily. It is preferred that the composition have a viscosity of from about 1000 to about 2000 cps.

B. The First Polymeric Material

It will be appreciated that the requirements of the first organic polymeric material of the present invention can also be satisfied by a large number of components and that, in view of the present disclosure, one having ordinary skill in the art is capable of selecting the first polymeric material for any particular application without undue experimentation. Accordingly, all such materials are within the scope of the present invention. It is preferred, however, that the first organic polymeric material of the present invention comprise polymeric particles which are readily combined with the carrier, and preferably plasticizer, to form a smooth, stable fluid paste. The fluidity and other characteristics of the present plastisol compositions are determined, in part, by the size of the first polymeric particles included in the composition. Thus, while it is believed that suspension resins having particle sizes of from about 75 to about 350 microns may be included in certain embodiments of the present invention, it is preferred that the first polymeric material comprise dispersion grade resins having a particle size of from about 0.02 to about 25 microns, with dispersion grade vinyl resins being even more preferred.

Processing techniques are well known and available for mixing such dispersion grade particles into carrier or plasticizer with sufficient shearing action to ensure dispersion of the first polymeric particles in the plasticizer. The particles may be optionally coated with an emulsifier to assist in the dispersion of the particles in the plasticizer.

The first organic polymeric materials of the present invention preferably comprise vinyl polymers and even more preferably vinyl chloride polymers. The vinyl chloride polymers can be simple, unmixed homopolymers of vinyl chloride or block copolymers, terpolymers or the like thereof in which the essential polymeric structure of poly(vinyl chloride) is interspersed at intervals with residues of the other ethylenically unsaturated compounds polymerized therewith. Furthermore, it is contemplated that mixtures and combinations of the above may be employed. It is contemplated that comonomers may include, for example: vinyl halides such as vinyl bromide and vinyl fluoride; vinyl esters such as vinyl acetate, vinyl chloroacetate, vinyl butyrate, other fatty acid vinyl esters, vinyl alkyl sulfonates and the like; vinyl ethers, such as vinyl ethylether, vinyl isopropyl ether, vinyl chloroethyl ether and the like; cyclic unsaturated compounds such as styrene, the mono- and poly-chloro styrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethylmaleate, diethyl fumarate and the like; vinylidene compounds, such as vinylidene chloride, vinylidene bromide, vinylidene fluorochloride and the like; unsaturated hydrocarbons such as ethylene, propylene, isobutene and the like; allyl compounds, such as allyl acetate, allyl chloride, allyl ethylether and the like; and conjugated and cross-conjugated ethlynically unsaturated compounds such as butadiene, isoprene, chloroprene, 2,3, dimethylbutadiene-1,3-piperylene, divinyl ketone and the like.

Although such vinyl chloride resins are preferred, it is contemplated that the present compositions may be formed using other polymeric material, and in its broadest sense the invention is not intended to be limited to any particular polymer or polymer groups since many other types and groups of polymers may be selected in view of the guidance of the present disclosure without undue experimentation.

C. The Carrier

The carrier, and particularly carrier which comprises plasticizer, generally functions so as to increase the workability, flexibility and/or distensibility of the first polymeric material of the present invention.

The liquid plasticizer of the plastisol or organosol forms of the present compositions is selected on the basis of its compatibility with the resin constituent of the composition, that is, its ability to produce a gel, and ultimately a fully fused solid, when the composition is heated. As is well known to those skilled in the art, plasticizers are generally high boiling, chemically and thermally stable organic liquids, low-melting solids or semi-solids. The present plasticizers affect several properties of the present compositions. For example, the plasticizer can have an effect on the rheology of the present fluid plastisols compositions as well as on the strength and flexibility of the present fused plastisols. With the guidance provided herein, it is expected that one skilled in the art will be capable of selecting the plasticizer needed for any particular application without undue experimentation. In general, however, it is highly preferred that the plasticizer be readily mixable with the particular first polymeric material to form a homogenous composition which resists exudation of the plasticizer. Furthermore, an important aspect of the present invention resides in the ability of the plasticizer to fluidize, solvate, gel and eventually fuse with the first polymer material selected.

In this regard, it is believed that the plasticizers of the present invention achieve the desired result through external plasticization of the present compositions. That is, the present plasticizers interact physically with the first polymeric material of the present invention to reduce the mutual attractive forces between polymer chains. Accordingly, while the plastisols of the present invention may include a certain amount of internal plasticization, such as, for example, copolymerization or graph polymerization of the vinyl chloride-vinyl acetate, this is not believed to be necessary for operation of the present invention. Accordingly, the plasticizers of the present invention serve to aid in the processing characteristics of the fluid plastisols to impart flexibility, elongation and toughness to the fused plastisol compositions. Another desirable property of the plasticizers of the present invention is thermal and oxidative stability since such materials are generally exposed to high temperatures, such as 350° F. and higher, during processing and use. For this reason anti-oxidants, such as biphenyl A, may optionally be employed in the present compositions.

It is contemplated that the amount of carrier used in the compositions of the present invention can vary widely, depending upon such factors as the desired properties and uses of the composition, the characteristics of the first polymer, and the like. For embodiments in which the carrier comprises plasticizer, it is generally preferred, however, that the present compositions contain from about 40 to about 75 parts by weight of plasticizer per 100 parts by weight of first polymeric material, with about 50 to about 60 parts per hundred being even more preferred. For embodiments in which the first polymeric material comprises vinyl chloride resin, and the second polymeric material comprises ethyl methacrylate resin, the use of about 55 to about 60 parts by weight of plasticizer per hundred parts by weight of first polymeric material is preferred.

The plasticizers of the present invention preferably comprise ester compounds such as monomeric phthalate esters, dibasic acid esters, trimellitates, phosphate esters and polyesters, with monomeric phthalate esters being the most preferred. Monomeric phthalate esters employed according to the present invention are preferably selected from the group comprising dibutyl phthalate (DBP), dibutoxy ethyl phthalate (DBEP), butyl benzyl phthalate (BBP), butyl octyl phthalate (BOP), dihexyl phthalate (DHP), dioctyl phthalate (DOP), diisooctyl phthalate (DIOP), dicapryl phthalate (DCP), dicapryldioctyl phthalate (DCOP), diisononyl phthalate (DINP), diisodecyl phthalate (DIDP), ditridecyl phthalate and mixtures of these. Dibasic acid esters used as plasticizers according to the present invention are preferably selected from the group comprised of adipate esters, azelate esters and sebecate esters, and mixtures of these. Adipate esters are preferably selected from the group comprising dioctyl adipates (DOA), diisononyl adipate (DINA), diisodecyl adipate (DIDA) and mixtures of these. The azelate esters are preferably selected from the group comprising dioctyl azelate (DOZ), diisooctyl azelate (DIOZ), di-n-hexyl azelate and mixtures of these. When sebecate esters are used, dibutyl sebecate, dioctyl sebecate, dibenzyl sebecate, butyl benzyl sebecate and mixtures of these are preferred. Phosphate esters used as plasticizers according to the present invention are preferably selected from the group comprising tricresyl phosphate, cresyl diphenyl phosphate, octyl diphenyl phosphate and mixtures of these.

It is also contemplated that glycol benzoates, glycol butyrates, citrates, isophthalates, and aliphatic and aromatic hydrocarbons and chlorinated hydrocarbons may also be used alone or in combination with those plasticizers described above.

The preferred plasticizer is a plasticizer mixture comprising: glycol butyrate, and preferably alkyl glycol butyrate; glycol benzoate, and preferably alkyl glycol benzoate; benzyl phthalate, and preferably alkyl benzyl phthalate; and aromatic and aliphatic hydrocarbons. According to especially preferred embodiments, the plasticizer is a plasticizer mixture comprising: alkyl glycol butyrate; alkyl glycol benzoate; alkyl benzyl phthalate; and aromatic and aliphatic hydrocarbons, and it is especially preferred that such mixture comprise from about 4 to about 38 parts by weight of alkyl benzyl phthalate per hundred parts of plasticizer mixture, and even more preferably about 4–5 parts.

Although the liquid compositions preferably comprise a plastisol in which the carrier is plasticizer, it should be understood that other materials can also be used as the carrier. For example, there can be used also an organosol, that is a composition containing fine particles of resin suspended in a liquid plasticizer and including also a volatile liquid solvent. The amount of solvent comprising the organosol depends mainly on the desired viscosity of the carrier, as discussed hereinbelow. It is contemplated that latex and other materials may constitute the liquid fluid compositions according to certain embodiments.

The present compositions may also contain other constituents as are known and available, including: various accelerators/stabilizers, initiators or catalysts, such as di-basic lead phthalate, zinc octoate, zinc oxide, lead octoate, di-basic lead phosphite, etc.; various light and/or heat stabilizers; coloring agents and pigments, such as titanium dioxide; solvents and diluents, such as methyl ethyl ketone, mineral spirits, etc.; fillers such as clay and limestone; viscosity improvers; UV absorbers; anti-oxidants; bacteriostats and bactericides; surfactants and many other conventional and well known additives and improvement agents. The specific nature and particular physical and chemical properties of these additives do not, in general, relate to the essence of the present inventive concept and, further specific elaboration of such additives is believed not to be required.

It is particularly preferred that small amounts of stabilizers, such as heat and light stabilizers, well-known in the art of making polyvinyl chloride compositions, be incorporated into the vinyl resin compositions of the present invention to minimize the effects of degeneration by light and heat. Primary stabilizers ordinarily used are metallo organic compounds, salts or complexes containing a metal component such as cadmium, zinc, lead, tin, barium or calcium combined with an alanine constituent such as ottowate, 2 ethyl hexowate, napthenate, tallate, benzoate, oxide, acetate, stearate, phenate, fluorate, caprylate, phosphite, phthalate, maleate, fumarate, carbonate, sulfate, silicate, alkyl mercaptide or mercapto acid salts and esters.

The composition comprising the liquid carrier material and dispersed decorative particles can be applied to the surface of a foamable layer of the sheeting, for example, foamable layers of the type described in U.S. Pat. No. 3,293,094, assigned to the same assignee as the present invention. It is believed that the present invention will be used quite extensively in this type of application, specific embodiments of which are the subject of the Example section herein.

II. THE PRODUCTS

The present invention also provides products which are especially well adapted to act as decorative surface coverings for floors, walls, and the like. In its broadest aspect, the surface covering products of the present invention comprise a layer of the solid composition of the present invention. While such layer may itself constitute a surface covering product according to certain embodiments, the present compositions are generally associated with additional elements which, together with such layer of the present composition, comprise the surface covering product. The layer of the present composition may be joined to the other components according to a wide variety of known techniques, including adhesive bonding, laminating and the like. According to other embodiments, the layer of the present composition is fused or joined with one or more elements of the floor covering to form a unitary, integral floor covering, as described more fully below in connection with FIGS. 1 and 2.

Figure 2:
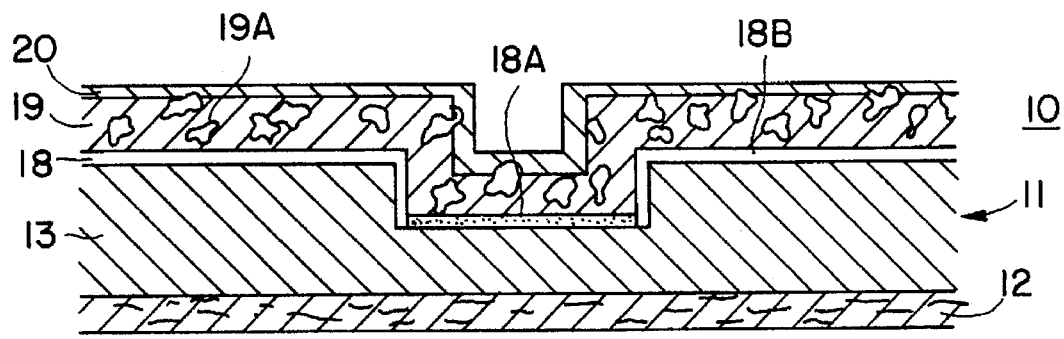

One embodiment of the product aspects of the present invention will now be generally described in connection with FIGS. 1–2, which are illustrative, but not limiting of the invention. The figures illustrate a resinous polymer sheet material, generally designated as 10, comprising a base layer or substrate 11 comprising a relatively flat sheet backing material 12. Optionally, but preferably, overlying the backing 12 is an intermediate or base layer 13 of resinous composition. An ink composition is deposited on the surface of the intermediate or base resinous layer, either randomly or in the form of a pattern or design, as illustrated in FIG. 2 as layer 18. A layer 19 of the present composition is supplied substantially uniformly over the layer 18 of printing ink. An additional wearlayer or topcoat 20, preferably of synthetic organic material, such as vinyl and urethane polymers, is applied over the decorative layer 19 of the present composition. The elements of the preferred constructions of the present products are described in greater detail hereinafter.

A. Substrate

The base layer or substrate 11 may comprise a relatively flat, fibrous backing sheet material 12 and/or a blown or unblown resinous polymer composition, such as shown in the figures as layer 13, having a chemically embossed, mechanically embossed or unembossed surface and/or other relatively flat sheet material.

A relatively flat, backing web or sheet material 12 may be used, if desired or required, as the base layer or substrate 11 for the resinous polymer sheet materials 10 of the present products. Such a backing sheet material 12 may comprise a felted or matted fibrous sheet of overlapping, intermingled fibers and/or filaments. Further, the backing sheet 12 may comprise a non-woven, knitted, woven or otherwise textile fabricated construction; or a sheet of resinous polymer composition; or paper or paper product or similar or like equivalent constructions and materials. Furthermore, the present substrate may be considered to comprise a laminate or composite of one or more of the above-noted materials. A felted fibrous sheet material comprising organic fibers, such as cellulose, cotton, jute, or rayon; or synthetic or man-made fibers and/or filaments, such as polyolefins, polyamides, acrylics, etc. is the most commonly employed backing material but many others are equally suitable and utilizable in certain embodiments. Such backing sheets are well known and available to those skilled in the art and are described, for example, in U.S. Pat. Nos. 3,293,094; 3,293,108; 3,660,186; and 4,274,916, each of which is assigned to the assignee of the present invention and incorporated herein by reference.

The thickness of such relatively flat backing sheet material depends upon numerous and varied factors, including the particular surface covering product which is to be made and the particular subsequent use for which it is intended. Normally, such thicknesses are in the range of from about 10 mils to about 90 mils, but other thicknesses, especially those greater than 90 mils, may be used according to certain embodiments of the present invention.

B. The Resinous Base or Intermediate Layer

The relatively flat backing sheet material 12 may be used by itself as a base layer or a substrate, or it may be used in conjunction with other sheet materials, such as, for example, a layer 13 of potentially foamable or non-foamable resinous polymer composition. According to certain embodiments, the relatively flat backing sheet material 12 may be omitted completely and the foamable or non-foamable resinous polymer composition 13 may be used by itself as a substrate or backing material. Such resinous polymer compositions may be made by well known standard and conventional methods and may contain one or more synthetic resins, such as polymer or co-polymer or vinyl chloride, or other resins, such as polyurethanes, as the main constituent resin. Other constituents of such resinous polymer composition may include one or more of the ingredients described in connection with the composition aspects of the present invention.

Although a polymer or co-polymer or vinyl chloride in the form of a plastisol is the preferred and typical synthetic resin to be incorporated into the resinous polymer composition used in the backing layer 11, many other resins are equally applicable, not only in plastisol form, but also in organosol, latex or solvent form.

For preferred compositions in which the resinous layer 13 is a foamed or foamable resinous layer, it is preferred that such layer include a blowing or foaming agent, when blowing or foaming is desired or required. Many acceptable blowing or foaming agents are contemplated for use within the scope of the present invention. Such specific foaming or blowing agent does not relate to the essence of the present invention and many other suitable and acceptable blowing or foaming agents are to be noted in the previously mentioned United States patents. All that is required is that the blowing or foaming agent has a sufficiently high decomposition temperature that it is not activated or decomposed prematurely during the earlier procedures of heating, gelling, etc., as described hereinafter.

If no backing sheet material such as felted or matted fibrous web is to be used, then the plastisol may be doctored by a doctor blade or roll coated, or poured, or cast, or otherwise applied to a strippable carrier which may be a steel belt, a rubber belt, release paper or a felt or other fabric having release coating thereon and subsequently stripped therefrom. However, if a backing sheet material is to be used and is to remain as part of the final product, then the plastisol may be doctored by a doctor blade, or roll coated, or cast, or otherwise applied and adhered to the carrying sheet material in a substantially uniform manner in a relatively uniform thin coating by procedures well known in the art. The thickness of such a plastisol coating, when in the form of a foamable resinous polymer composition, as applied and still wet, is in the range of from about 5 to about 50 mils, or even more if preferred or desired. After the plastisol has been applied to the carrying backing sheet and blown or foamed as described more fully hereinafter, the layer 13 of resinous material will typically have a thickness of from about 20 to about 40 mils.

C. The Printing Ink Layer

Overlaying the substrate 11, including base resinous layer 13 is a layer 18 of a suitable printing ink composition in the desired or required pattern or design. The particular pattern, design and color of the printing ink layer does not relate to the essence of the present invention and any suitable pattern or design may be selected.

According to preferred embodiments in which the resinous layer 13 is a foamable or blowable resinous layer, it is preferred that the pattern or design of the printing ink layer include certain predetermined areas or colors 18A which contain a blowing modifier, such as an inhibitor and/or initiator or catalyst. However, other predetermined areas or colors 18B do not contain any such blowing modifier or any such initiator or catalyst. If different levels of the height of the blowing or foaming effect is desired, then predetermined parts or portions of the pattern or design layer 18 may contain a blow modifier or inhibitor in different amounts, concentrations, or types, and so forth, depending upon the variety of differential blowing or foaming effects desired. The blowing or foaming aspects of the present product do not relate to the essence of the inventive concept of the present invention, and some typical and well known conventional and printing ink compositions are noted in the previously described United States patents.

D. The Decorative Layer

The present products contain a layer or coating 19 of the present composition. For the purposes of convenience, this layer is sometimes referred to herein as the decorative layer. It will be appreciated, however, that other layers or elements of the present products may contribute to the decorative effect.

The thickness of the decorative layer can vary over a relatively wide range, and in the main, will be governed by the functional and/or aesthetic characteristics desired in the product. For most applications, it is believed that the thickness of the decorative layer will be about 0.015 to about 0.075 inch, with the preferred thickness being about 0.02 to about 0.05 inch. As can be seen from the figures, the second polymeric material 19A in layer 19 need not be entirely surrounded by the remaining components of the composition, and it is possible that some of the second polymer particles 19A may protrude somewhat from the surface of the layer. In general, however, the thickness of the decorative layer 19 is selected to be larger than the largest dimension of the second polymeric particles.

E. The Topcoat

Applied over and adhered to the layer 19 of the solid composition of the present invention is a topcoat or wear-layer 20, preferably in the form of a resinous polymer composition or plastisol. Such a wearlayer may contain conventional or standard constituents, such as resins, plasticizers, stabilizers, solvents, diluents, viscosity improvement in controlling agents, and like additives and materials. The topcoat preferably comprises a layer having a thickness or depth of from about 0.0005 inch to about 0.015 inch.

III. THE METHODS

As described hereinabove, it is highly desirable that the second polymeric material of the present compositions exhibits softening and swelling, and preferably substantial softening and swelling, prior to fusion of the remaining components of the fluid composition. Applicants have found that highly desirable and beneficial properties, including enhanced visual effects, are obtained when the liquid compositions of the present invention are processed under time and temperature conditions sufficient to enable softening, and preferably substantial softening and swelling, of the second polymeric material prior to fusion, and preferably during gelation, of the liquid composition.

As is appreciated by those skilled in the art, fluid compositions of the type described herein, and particularly fluid plastisols, are converted from their fluid state to their solid state by heating the fluid composition under time and temperature conditions effective to fuse the plastisol and form a strong, wear resistant solid material. According to the methods of the present invention, it is preferred that this heating step comprise heating the fluid plastisol compositions to a temperature which is (1) less than about the fusion temperature of said plastisol and (2) greater than the softening point temperature of the second polymeric material for a period of time sufficient to allow the second polymeric material to swell and soften in the unfused plastisol.

It will be appreciated by those skilled in the art that the appropriate time and temperature conditions used to carry out the heating step of the present invention will vary depending upon numerous factors, such as the particular first and second polymeric material and plasticizer being used, as well as the equipment being used.

In typical processes for manufacturing surface covering materials, and in particular floor covering materials, the fluid composition of the present invention is applied as a relatively thin film or layer to a backing web or substrate. In such embodiments, the heating step of the present invention will generally comprise introducing the coated web or substrate into a heated chamber. It is typical that the web or substrate is introduced continuously into the heated chamber, typically a furnace or oven, and has a predetermined residence time therein. Furthermore, such furnace or oven typically includes one or more zones or sections thereof which are maintained at different temperature levels, with the temperature levels typically increasing gradually from the inlet section of the oven and peaking at or near the outlet section of the oven. In view of the information provided herein, it is expected that those skilled in the art will be capable of determining the appropriate conditions for carrying out the heating step hereof, including adjustment of the temperatures and line speeds of such typically used ovens, without undue experimentation.

It is generally preferred that the heating step of the present invention comprise heating the fluid composition hereof to temperatures above the softening point of the second polymeric material, but below the fusion temperature of the composition for at least about 0.75 minutes, and even more preferably at least about 1.5 minutes. According to preferred embodiments in which the carrier comprises plasticizer, the first polymeric material comprises vinyl resin, and the second polymeric material comprises acrylate resin, it is preferred that the heating time of the second polymeric material is at least about 1.5 minutes and even more preferably from about 1.5 to about 4 minutes.

Applicants have found that regulation and control of the heating times as described herein is important in achieving the desirable aesthetic qualities of certain solid compositions of the present invention. In particular, when the heating times are insufficiently short, the second polymeric material is unable to adequately soften and swell in the plastisol prior to fusion thereof. This failure of swelling or softening detracts from the desirable aesthetic properties of the present solid compositions.

An example which incorporates the present heating step involves the production of a surface covering product useful as a floor covering. In particular, a backing material with a vinyl plastisol having incorporated therein a blowing agent (for example, a compound which decomposes at elevated temperature to yield a gas), and an accelerator for the blowing agent (a material which lowers the temperature at which blowing agent normally decomposes) is provided. After the plastisol is applied to the backing, it is heated to a temperature at which the plastisol gels, as is well known in the art. Thereafter, the surface of the gelled plastisol can optionally, but preferably, be printed with a liquid embossing composition that imparts a design to the product. The embossing composition typically comprises a resin binder, pigment and an inhibitor for the accelerator (that is, a material which deactivates the accelerator so that when the composite is heated to an elevated temperature at a later stage of the manufacturing process to decompose the blowing agent, those surface portions of the plastisol that are printed with the embossing composition are not expanded.) After printing with the embossing composition, the resulting composite has applied thereto a fluid composition of the present invention. In preferred form, the fluid composition comprises essential and optional ingredients selected to provide a decorative layer which has particularly good wearing characteristics. Such a composition is the described in the Example section herein.

Application of the present coating composition may comprise any one of myriad techniques commonly employed for coating a liquid onto a surface. It is preferred, however, that the composition be applied using the reverse roll coating technique. The reverse roll coater is a well-known device that has been used in the past to apply a coating composition in a continuous fashion to a moving surface. However, it is believed that a reverse roll coater has not been known for use in applying compositions of the type described herein in applications involving the production of multi-layered sheeting. In the use of a reverse roll coater, the liquid composition is applied to the receiving surface by means of a roll which is rotated in a direction opposite to that in which the receiving surface is moved. The reverse roll coater typically employs at least two rolls, one of which is an applicator roll, that is, the roll which carries and applies the liquid composition to the receiving surface. The other roll is termed the metering roll and is positioned relative to the applicator roll in a manner such that a space is provided between the two rolls to permit the liquid composition to flow therethrough at a desired rate. The metering roll rotates in a direction opposite the direction of the applicator roll. Typically, the liquid composition is fed to the nip between the metering roll and applicator roll in a manner such that a pool of the liquid composition builds up in the nip. The applicator roll carries composition from the pool to the receiving surface. In preferred form, the applicator and metering rolls are typically made from elastomeric materials such as synthetic rubbers.

Figure 3:
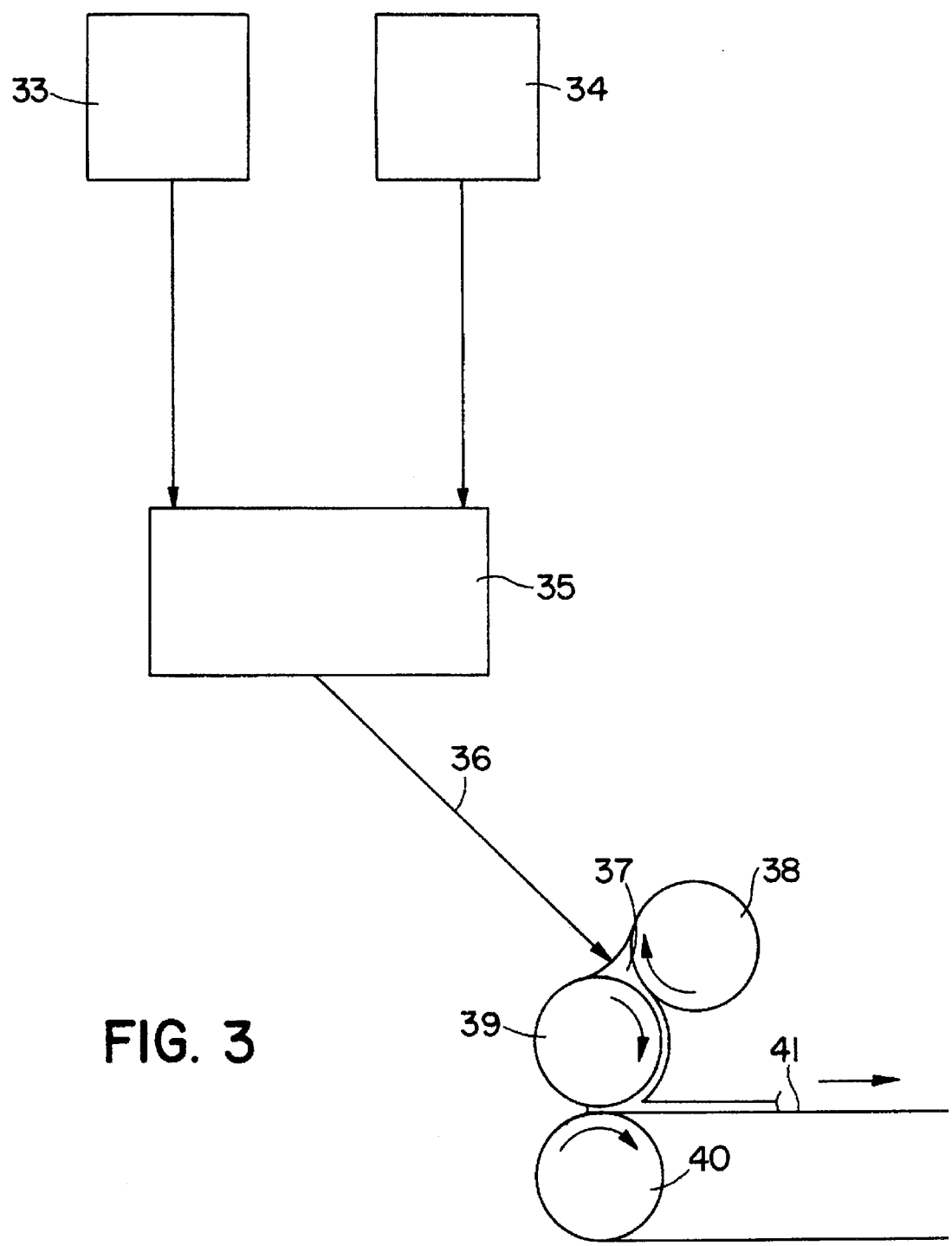

The reverse roll coating process is illustrated in FIG. 3. Particles of the second polymeric material, such as ethyl methacrylate particles, and a liquid carrier material such as a plastisol are fed to mixing tank 35 via gravimetric feeders 33 and 34 respectively. The resultant composition comprising the plastisol having the decorative particles suspended therein is fed to the nip between metering roll 38 and applicator roll 39, where it forms a pool 37 or a reservoir of composition. Metering roll 38 rotates in a direction opposite the direction of applicator roll 39. The space between the metering and applicator rolls is adjusted to permit the desired amount of liquid composition to be carried by the rotating surface of applicator roll 39 to the surface of the layer 41 which is carried by conveyor roll 40 which rotates in a direction opposite that of the applicator roll 39.

Inasmuch as the use of rolls for applying various types of films or coatings to surfaces of many diversified objects is a well known commercial practice, and since the improved process of the present invention utilizes the basic equipment involved in such practices, such auxiliary features as supporting means for the rolls, as well as for chains, belt drive means, and pressure adjusting means for the rolls have been omitted from the drawing.

Although it is expected that the present invention will be used widely in the manufacture of multi-layered sheeting which is designed especially for use as floor coverings, it should be understood that the invention can be used also to manufacture other types of multi-layered sheeting prepared from compositions of the type that are particularly useful for a variety of different kinds of products, such as, for example, wall and ceiling coverings, and table, desk, and counter top surfaces.

The examples below are illustrative of the present invention.

EXAMPLE I

This example shows the preparation of a multilayered floor covering comprising a carrier substrate having adhered to one side thereof an embossed foamed resinous layer. A composition of the present invention covers and is adhered to the foamed resinous wear layer. The details of the process and materials used to produce this floor covering are described below.

About 14 mils (0.014") of a foamable plastisol are coated onto a carrier substrate having a thickness of about 28 mils (0.028") according to prior art techniques. The carrier substrate, which is fed from a roll thereof, is about 12' wide and comprises a felt backing.

The foamable plastisol comprises the following.

|  | Amts., lbs. |
|---|---|
| Goodrich Geon 180 × 10 dispersion grade PVC Resin | 450 |
| Occidental 567 dispersion grade PVC PVC Resin | 250 |
| plasticizer | 350 |
| alkyl & aryl hydrocarbons | 40 |
| 2% Mildewcide in BBP | 70 |
| mineral spirits | 3 |
| blowing agent | 39 |
| filler | 300 |
| Total Weight | 1502 |

The plastisol has a Brookfield viscosity of about 1100–2700 cps @ 80° F.–95° F.).

The foamable plastisol supported by the carrier substrate is gelled. The 2-ply composite is wound into a roll and conveyed to a printing station. At the printing station, the roll is unwound and a pattern is printed on the surface of the gelled foamable plastisol by means of a rotogravure press. For this purpose, there is used an embossing composition which included therein pigment and an inhibitor for deactivating the blowing agent in certain regions of the gelled foamable plastisol. (As described in U.S. Pat. No. 3,292,094, assigned to the same assignee as the present invention, the inhibitor, upon coming into contact with the blowing agent, has the effect of raising the temperature at which the blowing agent "blows". Thus, when the gelled foamable plastisol is fused by heating the composite to an elevated temperature at a later stage of the manufacturing process, the selected portions of the plastisol that are printed with the embossing composition are not expanded, expansion being limited to those portions of the plastisol which are foamed as a result of the activation of the blowing agent.) The printed gelled composite is then wound and transported to a fusion line.

At the fusion line, the printed gelled composite is unwound and is coated with the present composition utilizing a reverse roll coater. A liquid resinous composition of the present invention is applied to the surface of the printed gelled composite in a thickness of about 14 mil by the reverse roll coater. The coating composition comprises a fusible fluid plastisol phase comprising the following constituents.

|  | Amts., lbs. |
|---|---|
| OXY 80 HC dispersion grade PVC | 550 |
| Borden 440 × 2 dispersion grade PVC | 300 |
| OXY BR501 suspension grade PVC | 50 |
| 2,2,4 trimethyl-1,3-pentanediol diisobutyrate (Eastman TXIB) | 137 |
| alkyl glycol butyrate and alkyl alkyl glycol benzoate plasticizer (Occidental N6000) | 162 |
| alkyl benzyl phthalate plasticizer (Monsanto S261) | 180 |
| aryl and alkyl hydrocarbons | 80 |
| heat/light stabilizers | 29 |
| epoxy soybean oil (Witco Drapex6.8) | 45 |
| Total Weight | 1533 |

The plastisol has a Brookfield viscosity of about 550–750 cps @ 86° F. (as measured by Brookfield #4 Spindle at 20 rpm).

The plastisol was prepared as follows. The plasticizers, along with heat stabilizers, light stabilizers, and diluents are added to a high shear Cowles$^R$ mixer. The liquids are blended together. The dispersion grade resins are then added to the plasticizer/stabilizer blend and thereafter the suspension grade resin is added. The plastisol is then mixed for about 6–8 minutes to insure proper dispersion of the resins. The temperature and viscosity of the plastisol are measured as a check for proper dispersion. The plastisol is then degassed to remove air that is induced from the mixing process.

Decorative particles of second polymeric material are then prepared. The particles of the second polymeric material comprise ethyl methacrylate particles sold under the trade designation Elvacite 2043. The decorative particles are processed through a 50 mesh screen and the remainder is retained. Desired particle size range for this particular application is about 250 microns.

A continuous mix and feed system is employed to mix the decorative particles and the plastisol for the purpose of forming the coating composition of the present invention, which in turn is fed to the reverse roll coater. For this purpose, the particles and plastisol are mixed in a conical-shaped mixing vessel which is equipped with a mixing basket and mixer. The particles and plastisol are fed respectively to the mixing vessel by use of a gravimetric feeder and variable speed liquid pump, each of which is capable of being controlled to deliver a specified mass ratio of the decorative particles to plastisol. The mass ratio of plastisol to particles in this application is about 100:25 (20 wt %). The resulting wearlayer composition, that is, the liquid plastisol having dispersed therein the decorative particles, is fed from the bottom of the mixing vessel to the reservoir of a reverse roll coater through a 3" diameter hose. The wearlayer comprising the second polymeric material has a viscosity of about 1400 cps @80° F. This composition is delivered from the pond of the reverse roll coater to the coater for application onto the surface of the aforedescribed printed gelled composite under the following conditions.

| | |
|---|---|
| wearlayer/decorative stock application (mils) | 14 |
| line speed (fpm) | 48–50 |
| backing roll speed (fpm) | 48 |
| applicator roll (fpm) | 70 |
| metering roll (fpm) | 2–3 |
| casting ratio | 1.46 |
| nip settings (mils) | 16 |

The printed gelled composite having the coating of fluid wearlayer composition is then converted to the solid composition of the present invention in a fusion oven. The softening temperature of the acrylate polymer used as the second polymeric material is about 145°–150° F., and the fusion temperature range of the vinyl resin in the plasticizer is about 300°–400° F. During processing, the composition of the present invention is raised to temperatures of from about 145 to less than about 300°–400° F. for about 0.75–1.5 minutes, and the ethyl methacrylate particles soften and swell to produce a desirable aesthetic effect. Fusion occurs at an elevated temperature to form an inlaid wearlayer and to decompose the blowing agent in the gelled base layer and effect foaming thereof in those portions not printed with the embossing composition. Gelling of the plastisol, softening of the second polymeric material and fusion is effected in an oven of the air-circulating type having six (6) zones. Zone temperatures (° F.) are as follows: (1) 280; (2)300; (3) 320; (4)390; (5)420; and (6)400.

A melanine/acrylate topcoat is then applied to the fused product. The exemplary floor covering has an exceptional appearance resembling ceramic tile and the following additional characteristics.

| | Inch |
|---|---|
| overall thickness | 64.5 |
| urethane topcoat | 0.5 |
| decorative wearlayer | 15 |
| foam layer | 35 |
| felt backing | 14 |

EXAMPLE II

Example I is repeated except that the present fluid plastisol composition had the following formulation:

| | Amts., lbs. |
|---|---|
| OXY 80 HC dispersion grade PVC | 550 |
| Borden 440 × 2 dispersion grade PVC | 300 |
| OXY BR501 suspension grade PVC | 50 |
| 2,2,4 trimethyl-1,3-pentanediol diisobutyrate (Eastman TXIB) | 240 |
| alkyl glycol butyrate and alkyl alkyl glycol benzoate plasticizer (Occidental N6000) | 220 |
| alkyl benzyl phthalate plasticizer (Monsanto S261) | 25 |
| aryl and alkyl hydrocarbons | 54 |
| heat/light stabilizers | 29 |
| epoxy soybean oil (Witco Drapex6.8) | 45 |
| Total Weight | 1513 |

The plastisol has a Brookfield viscosity of about 550–750 cps @86° F. (as measured by Brookfield #4 Spindle at 20 rpm).

A continuous mix and feed system of the type described in Example I is employed to mix the decorative particles and the plastisol for the purpose of forming the coating composition. The mass ratio of plastisol to particles in this application is about 100:25 (20 wt %). The resulting wearlayer composition, that is, the liquid plastisol having dispersed therein the decorative particles, is fed from the bottom of the mixing vessel to the reservoir of a reverse roll coater through a 3" diameter hose. The wearlayer comprising the second polymeric material has a viscosity of about 1400 cps @80° F. This composition is delivered from the pond of the reverse roll coater to the coater for application onto the surface of the aforedescribed printed gelled composite under the following conditions.

| | |
|---|---|
| wearlayer/decorative stock application (mils) | 14 |
| line speed (fpm) | 48–50 |
| backing roll speed (fpm) | 48 |
| applicator roll (fpm) | 70 |
| metering roll (fpm) | 2–3 |
| casting ratio | 1.46 |
| nip settings (mils) | 16 |

The printed gelled composite having the coating of fluid wearlayer composition is then converted to the solid composition of the present invention in a fusion oven. The softening temperature of the acrylate polymer used as the second polymeric material is about 145°–150° F., and the fusion temperature range of the vinyl resin in the plasticizer is about 300°–400° F. During fusion, the composition of the present invention is heated to temperatures of from about 145 to less than about 300°–400° F. for about 0.75–1.5 minutes, and the ethyl methacrylate particles soften and swell in the unfused plastisol to produce a desirable aesthetic effect. Fusion occurs at an elevated temperature to form an inlaid wearlayer and to decompose the blowing agent in the gelled base layer and effect foaming thereof in those portions not printed with the embossing composition. Gelling of the plastisol, softening of the second polymeric material and fusion is effected in an oven of the air-circulating type having six (6) zones. Zone temperatures (° F.) are as follows: (1)280; (2)300; (3)320; (4)390; (5)420; and (6)400.

A melanine/acrylate top coat is then applied to the fused product. The exemplary floor covering has an exceptional appearance resembling ceramic tile and the following additional characteristics.

| | Inch |
|---|---|
| overall thickness | 64.5 |
| urethane topcoat | 0.5 |
| decorative wearlayer | 15 |
| foam layer | 35 |
| felt backing | 14 |

What is claimed is:

1. A decorative surface covering comprising a layer of a solid composition comprising plasticizer, first organic polymeric material fused in said plasticizer and particles of second polymeric material comprising particles of poly (ethylene methacrylate) in an amount of from about 10 percent to about 25 percent by weight of said solid composition not fused in said plasticizer, said plasticizer increasing the flexibility of said first polymeric material, said particles of second polymeric material having a softening point temperature below about the fusion temperature range of said first organic polymeric material in said plasticizer, whereby said particles are substantially swollen and deformed particles.

2. The composition of claim 1 wherein said fusion temperature range is about 280° F. or greater.

3. The composition of claim 1 wherein said first organic polymeric material comprises vinyl polymer and said plasticizer comprises an ester.

4. The composition of claim 1 comprising from about 15 percent to about 25 percent by weight of said second organic polymeric material.

5. The composition of claim 4 wherein said first organic polymeric material comprises vinyl chloride polymer.

6. The composition of claim 4 wherein said second organic polymeric material comprises acrylate polymer.

7. The composition of claim 6 wherein said acrylate polymer comprises poly(ethylene methacrylate).

8. The composition of claim 1 wherein said second polymeric material comprises organic polymer particles having a particle size of up to about 250 micron.

9. A decorative surface covering comprising a layer of a solid composition comprising plasticizer, first organic polymeric material fused in said plasticizer and particles of second polymeric material not fused in said plasticizer, said plasticizer increasing the flexibility of said first polymeric material, said particles of second polymeric material comprising particles of acrylate polymer and having a softening point temperature below about the fusion temperature range of said first organic polymeric material in said plasticizer, wherein said first organic polymeric material comprises polyvinyl chloride particles having a mean particle size of from 0.02 micron to about 25 microns and whereby said particles of second polymeric material are substantially swollen and deformed particles.

10. The composition of claim 9 wherein said second organic polymeric material comprises acrylate polymer.

11. The composition of claim 10 wherein said acrylate polymer comprises poly(ethylene methacrylate).

12. A process for producing a surface covering composition comprising:

providing a fusible fluid plastisol composition comprising: (a) plasticizer selected from the group consisting of glycol benzoates, glycol butyrates, benzyl phthalates, alkyl and aryl hydrocarbons and mixtures of these; (b) first polymeric material fusible in said plasticizer, said first polymeric material comprising vinyl chloride polymer particles dispersed, suspended or dissolved in said plasticizer; and (c) particles of second polymeric material comprising particles of acrylate polymer having a softening point temperature below about the fusion temperature of said first polymeric material in said plasticizer;

gelling said composition;

softening and substantially deforming said second polymeric material during the gelation of said composition; and fusing said gelled composition at a temperature of about 280° F. or greater while said particles of second polymeric material are in the softened, deformed shape.

13. The method of claim 12 wherein:

said gelling step comprises raising the temperature of said plastisol; and said softening step comprises controlling the rate of temperature increase of said gelling step to permit substantial softening of said particles of said second polymeric material during gelation of the plastisol.

14. The method of claim 12 wherein said controlling step comprises maintaining the temperature of said plastisol above about the softening temperature of said second polymeric material and below about said fusion temperature for a time sufficient to achieve substantial softening of said second polymer.

15. The method of claim 12 wherein said fusion temperature range is about 280° F. or greater.

16. The method of claim 12 wherein said first organic polymeric material comprises vinyl polymer.

17. The method of claim 12 wherein said fusion temperature of about 280° F. or greater.

18. The method of claim 12 wherein said acrylate polymer comprises poly(ethylene methacrylate).

19. The method of claim 18 wherein said composition comprises from about 1 percent to about 25 percent by weight of said poly(ethylene methacrylate).

20. The method of claim 19 wherein said plasticizer comprises an ester.

21. The method of claim 12 wherein said composition comprises from about 40 to about 65 percent by weight of said plasticizer.

* * * * *